United States Patent [19]

Legris

[11] Patent Number: 4,782,852

[45] Date of Patent: Nov. 8, 1988

[54] ASSEMBLY FOR PERFECTING FLUID DISTRIBUTION IN MULTIPLE CONDUITS

[75] Inventor: André A. J. Legris, Rennes, France

[73] Assignee: Legris, Rennes, France

[21] Appl. No.: 133,177

[22] Filed: Dec. 11, 1987

Related U.S. Application Data

[63] Continuation of Ser. No. 855,567, Apr. 25, 1986, abandoned.

[30] Foreign Application Priority Data

Apr. 29, 1985 [FR] France .................................. 8506628

[51] Int. Cl.$^4$ .............................................. F16K 27/00
[52] U.S. Cl. .................................... 137/269; 137/271; 137/561 R
[58] Field of Search ........... 137/269, 270, 271, 561 R, 137/501 A, 884; 285/91, 120, 150, 156, 396, 360, 376

[56] References Cited

U.S. PATENT DOCUMENTS

| | | | |
|---|---|---|---|
| 1,103,936 | 7/1914 | Brophy . | |
| 3,162,470 | 12/1964 | Davidson et al. | 285/376 X |
| 3,506,029 | 4/1970 | Demler, Sr. et al. | 285/156 X |
| 3,516,442 | 6/1970 | Munroe . | |
| 3,538,940 | 11/1970 | Graham | 137/271 |
| 3,560,027 | 2/1971 | Graham | 285/150 |
| 4,247,133 | 1/1981 | Möller . | |
| 4,527,745 | 7/1985 | Butterfield et al. | 285/376 X |

FOREIGN PATENT DOCUMENTS

| | | |
|---|---|---|
| 0052717 | 6/1982 | European Pat. Off. . |
| 2229685 | 1/1974 | Fed. Rep. of Germany . |
| 2067506 | 8/1971 | France . |
| 2257846 | 8/1975 | France . |
| 2431680 | 2/1980 | France . |
| 2528531 | 12/1983 | France . |
| WO82/01205 | 4/1982 | World Int. Prop. O. . |

OTHER PUBLICATIONS

"Gra-Tec" catalog. Los Altos, Calif. 94022; October 1967.

Primary Examiner—A. Michael Chambers
Assistant Examiner—John C. Fox
Attorney, Agent, or Firm—Sughrue, Mion, Zinn, Macpeak, and Seas

[57] ABSTRACT

An assembly for perfecting the distribution of fluids in multiple conduits intended for the distribution of a main circuit in multiple secondary tubular circuits, it comprises multiple modules 4, 10, 5 linked together by double male bayonet connections. The modules all have the same female orifices, occupied by male bayonets 7h all identical and of the same dimension extended at their other end by connections 7 for tube 12. Male bayonet plugs 3, with their bayonets 3h and taps 6 bearing identical male bayonets 6h may also occupy any of the female bayonets of the distribution module.

The invention is used for the distribution of water and in particular in the building industry for use with sanitary and heating water.

20 Claims, 8 Drawing Sheets

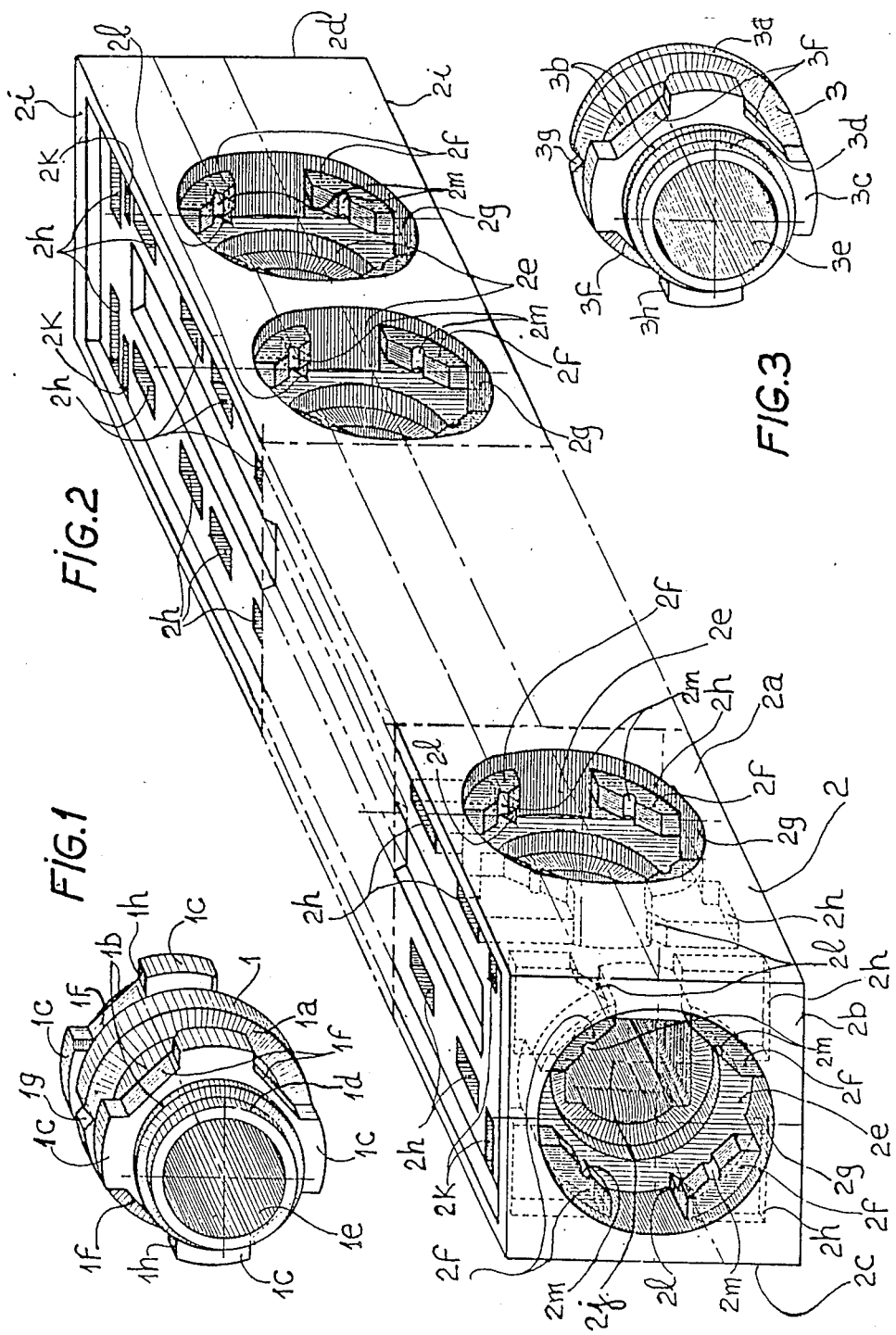

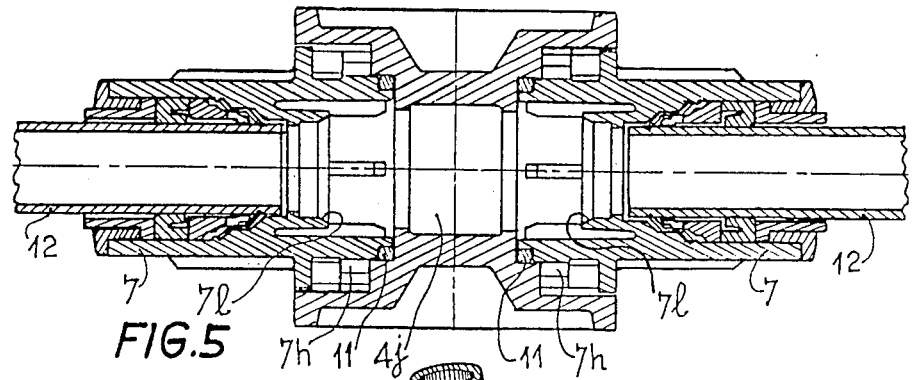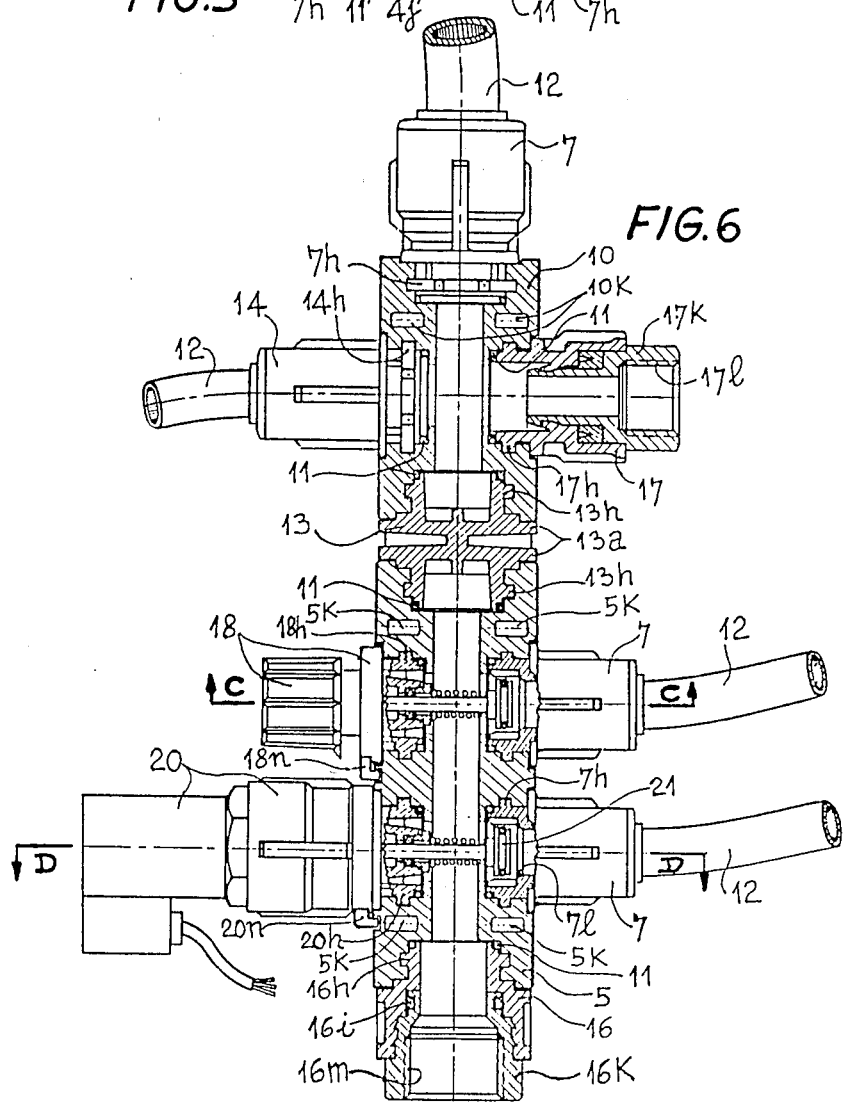

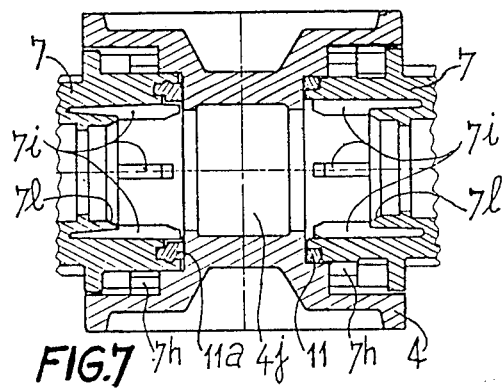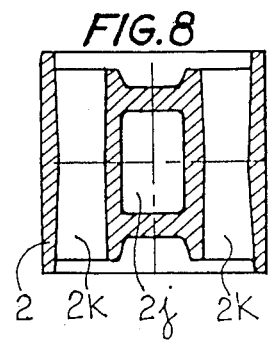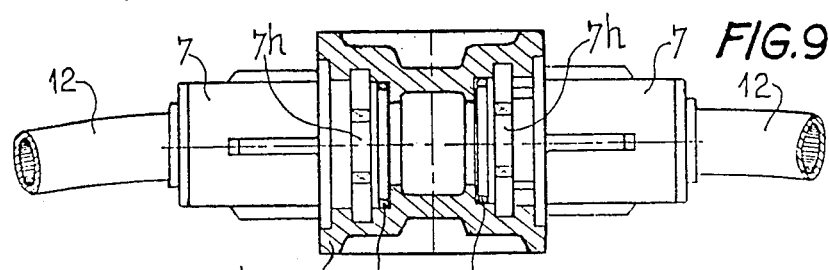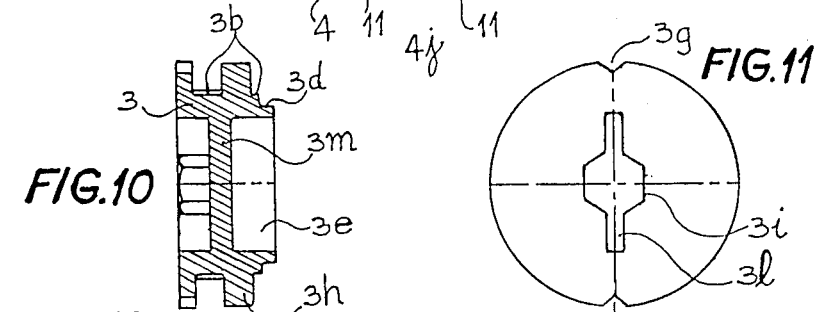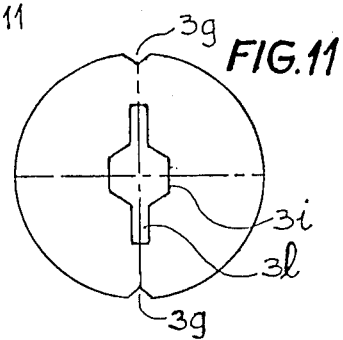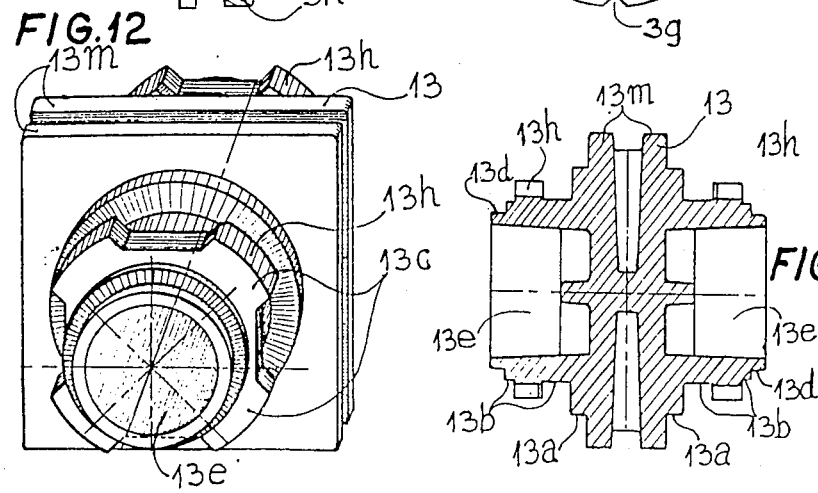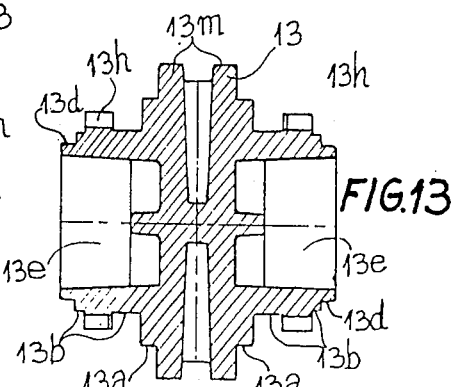

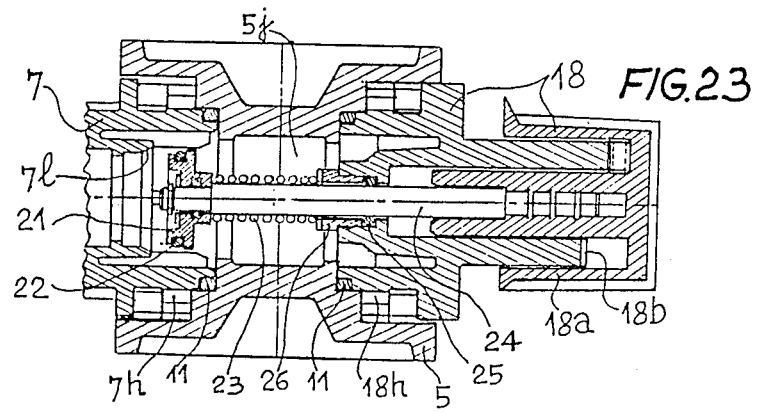
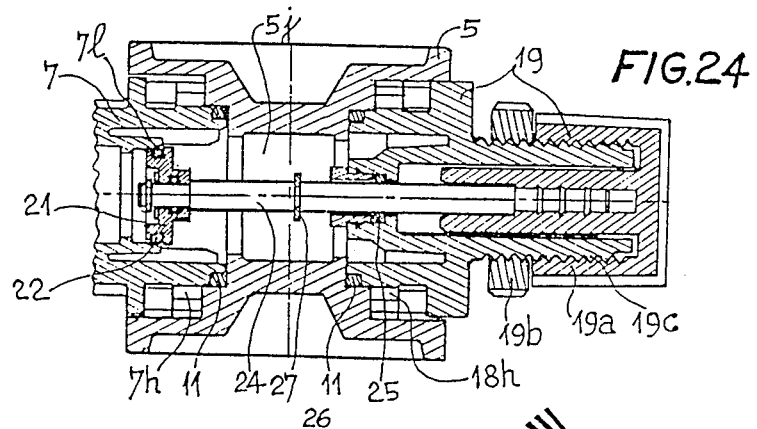
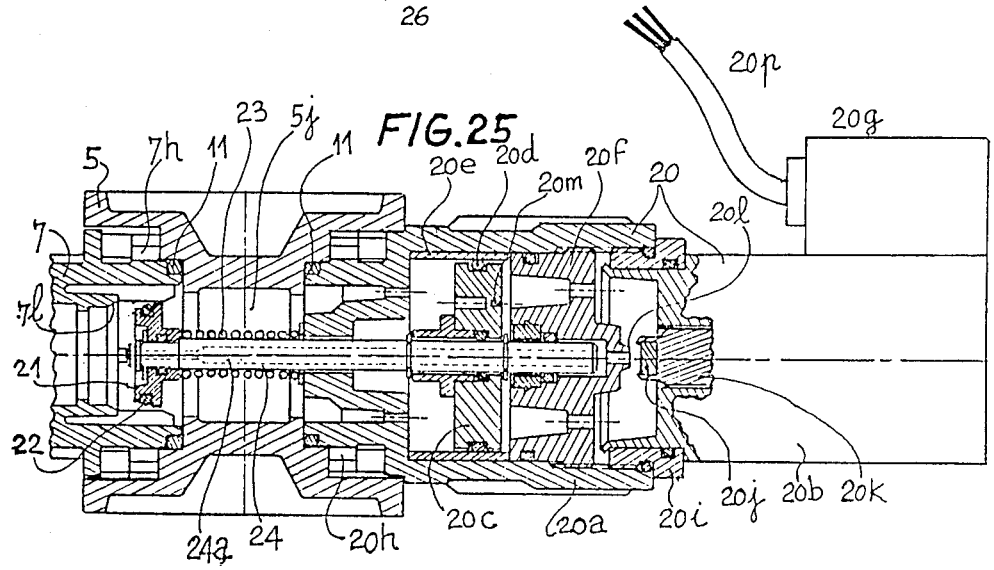

ASSEMBLY FOR PERFECTING FLUID DISTRIBUTION IN MULTIPLE CONDUITS

This is a continuation of application Ser. No. 855,567, filed Apr. 25, 1986, now abandoned.

FIELD OF THE INVENTION

This invention is intended to perfect grouped fluid connections for distributing a main circuit fluid in multiple secondary tubular circuits. The connection grouping is of the modular type.

BACKGROUND OF THE INVENTION

The standard method of redistributing fluids in multiple tubes is to have a large metallic collector on which are smaller threaded manifolds or nozzles, to which the multiple tubes can be connected. These collectors are made by casting and machining or by welding.

The tube connections on these collectors are standard and in general well known. However they provide no flexibility concerning the number of connections.

Their cost is considerable and connection costs are high because they require very expensive highly qualified plumbing labour.

With the recent development of plastic tubes, resistant to pressure and heat, considerable efforts have been made to carry out more flexible, practical modular connections with, as well, the integration in the modules of new "instantaneous" tube connections which require neither tightening nor screwing but can be connected simply by pushing the tube into a special joint.

The use of very high-quality moulded plastic enables sophisticated collectors to be moulded at low cost.

The inventor already possesses numerous patents in this field: French Pat. No. 2.528.531, French Pat. No. 2.067.506, German and French 2431680 and 7324472. The following patents are also known: European 0052717 - International WO 82/01205 - U.S. Pat. Nos. 1,103,936 and 3,516,442 - 4,247,133 - German 2.229.685.

Even if these patents have advanced the state of the art they still have important financial drawbacks concerning cost and use. While metallic collectors were not modular enough and involved costly tube connection, the above patents are too modular: their assembly in numerous modules is therefore time-consuming and expensive. A happy medium has now been found and this invention concerns a highly-modular system, yet one which because of its design and assembly technique is not expensive.

The available systems are not homogeneous in design. They offer a type of assembly between modules, using dovetails, sliders, threaded rods for holding, or bayonets. But the same assemblies are never used at the level of tube connection - the tubes are assembled either in standard screwed fashion or by instantaneous connections integrated with the module. Only French Pat. No. 1.522.553 proposes a dovetail slider for connecting the only possible output tube. But this system, intended for sprinkling, is completely heterogeneous, the 3 outputs being in different systems.

The device described below, in accordance with the invention, has evolved out of the inventor's numerous inventions in this field, in particular improvements and perfection to remove the inconveniences of the inventor's French Pat. No. 2.528.531, and offer these advantages at much lower cost than before.

SUMMARY OF THE INVENTION

The present invention is to a flexible modular system. The connections of modules between each other, the tube connections and those of the different possible accessories, links, plugs, taps, electromagnetic valves, all employ a single identical interchangeable connection system of the same dimensions. The same connection is used for everything. This connection is a particular, specially-adapted type, being very robust and using the interconnection of male and female bayonets. Although bayonet systems are already well-known, the system in this invention, the method of juxtaposing the bayonets in order to obtain smaller or larger modules, the design of the modules - all these things are new and original. And naturally the same connection for modules and tubes is also original.

In conformity with the invention, the modules are made up of a solid in the general shape of a parallelepiped of rectangular or square section, varying in length depending on the number of orifices required. This parallelepiped possesses four flat, adjacent sides in which the "identical" orifices are available, each with 4 lugs in relief inside the cylindrical bore of the orifice. These lugs are in relief because recesses are cut out behind them from two of the latter sides, opposite each other in pairs, made in the flat (but recessed) sides. Each orifice possesses therefore (on two sides of the parallelepiped) two recesses on each one of these sides. The recesses form, together with the lugs and the cylindrical boring, female bayonets in 4 positions, placed at every 90° point. The angle of grip of the bayonet is by a rotation of 45°, enabling the tubes to be directed in one of four directions according to choice.

All the female bayonet orifices connect with the main central conduit which is in the longtitudinal axis of the parallelipipede.

For assembly, male bayonet orifices of an appropriate and complementary shape are fitted inside the female bayonet orifices. These male bayonets continue outside the module, either in the form of an identical male bayonet forming a link between two modules, or as a sealer plug, or as a link for tubes of different type, or as a head for a valve tap, or as a head for an electromagnetic valve, the said valves operating in conjunction with a male bayonet. The male bayonets bearing the tube connections also bear on the module side a conical valve seating working in conjunction with another male bayonet element (of the valve type) of the orifice in the side directly opposite on the same axis.

The male bayonets possess two or four half-round flanges, on a cylindrical diameter, which form an engagement by rotation in relation to the complementary recesses of the lugs of the female bayonets. This engagement locks the male bayonets solidly into the female ones and vice versa, without axial effort.

The female bayonets also have two relief stops which prevent the pieces from being fitted together in the wrong rotational direction, and which also serve to stop the locking rotational movement at the right point. Thanks to these stops, it is impossible to make a wrong move when the bayonets are being fitted together.

The male bayonets are in the shape of a cross, having arms linked by a square, the said cross being placed on a cylinder.

The recessed sides of the modules, with the openings behind the lugs of the female bayonets, do not have bayonet openings and act as support points on a flat support. Two or four holes or fixing bores traverse the module and enable it to be screwed onto flat supports or surfaces.

Thus the shape of the modules and the female bayonets enables moulding by simple strip moulding, in two opposing directions, of the 4 female bayonet lugs, using high-quality plastic material at very moderate prices, without any machining or factory work. Because of the design, male bayonets are also easily moulded in plastic with all necessary detailing.

In this way it is possible to produce modules with 4, 6, 8, 10 or more orifices. With the 4 above-mentioned types of modules, which can be linked virtually instantaneously to each other by double links between male bayonets, it is possible to carry out modular assemblies, with multiple tube outlets, at very low cost. In fact it is much cheaper to carry out modules with 8 or 10 orifices than to assemble 3, 4, 5 or 6 modules with only 2 tube outputs out of 4 orifices to achieve the same result.

One of the important characteristics of the invention is that on the modules, at each female bayonet orifice, one can mount either another module (with a connection), a tube connection, a plug, a tap accessory, or an electromagnetic valve gate.

The flexibility offered by the system is such that the number of possible combinations is enormous and users will be able to create their own products themselves. The design and reliability of the joints enables use by an unskilled labour-force without special training.

Using the modules with 6, 8 or 10 orifices modularity to reasonable proportions and at the same time reduces assembly costs, assembly time and the number of joints required. Assemblies carried out in this way can be dismantled, modified, and if necessary repaired very rapidly at low cost.

Various connections are possible for male bayonets: instantaneous for tubes, but also with male or female threading for standard connections.

BRIEF DESCRIPTION OF THE DRAWINGS

Other advantages and characteristics of the inventions will be better understood after reading the description below of the various production types and by referring to the annexed drawings on which:

FIG. 1 is a perspective view of a double male bayonet connection in accordance with the invention, the connection being used to join together two modules.

FIG. 2 is an isometric projection of a single module in accordance with the invention, with its female bayonet orifices.

FIG. 3 is an isometric projection of a male bayonet plug.

FIG. 5 is a section following axis BB of FIG. 4 of module 4 in accordance with the invention and showing two male bayonet tube connections.

FIG. 6 is a partial section of two 5 and 10 modules linked by a visible plug 13 and with the male bayonets forming connections to a valve-tap and electromagnetic valve gate in accordance with the invention.

FIG. 7 is a partial transverse section of a module with male bayonets, showing 2 types of joint between the male bayonets and the body of the module, the seating and the valve guides in the male bayonet tube connections in accordance with the invention.

FIG. 8 is a transverse section along the axis of the holes 2K which are used to fix the module in accordance with the invention onto a support by means of screws passing through the holes.

FIG. 9 is a partial transverse section of a module 4 following axis BB with male bayonet tube connections and their joints in accordance with the invention.

FIGS. 10 and 11 show the plug in accordance with the invention, the male bayonet and the method for fitting it for turning.

FIGS. 12 and 13 show the details of of a double male bayonet plug, acting as a visible connection between 2 modules in accordance with the invention.

FIG. 17 is the section as per AA of FIG. 18.

FIG. 23 shows the section as per CC of module 5 in FIG. 6 in accordance with the invention and showing details of the male bayonet valve-tap with helicoid stem.

FIG. 24 shows a variant of FIG. 23 with the valve closed controlled by a screw and nut control.

FIG. 25 shows a section as per DD of module 5 in FIG. 6 in accordance with the invention showing the male electromagnetic gate bayonet with servo-assisted valve, open, and the male bayonet tube connection and its valve seating.

DESCRIPTION OF THE PREFERRED EMBODIMENTS

Figure 4:
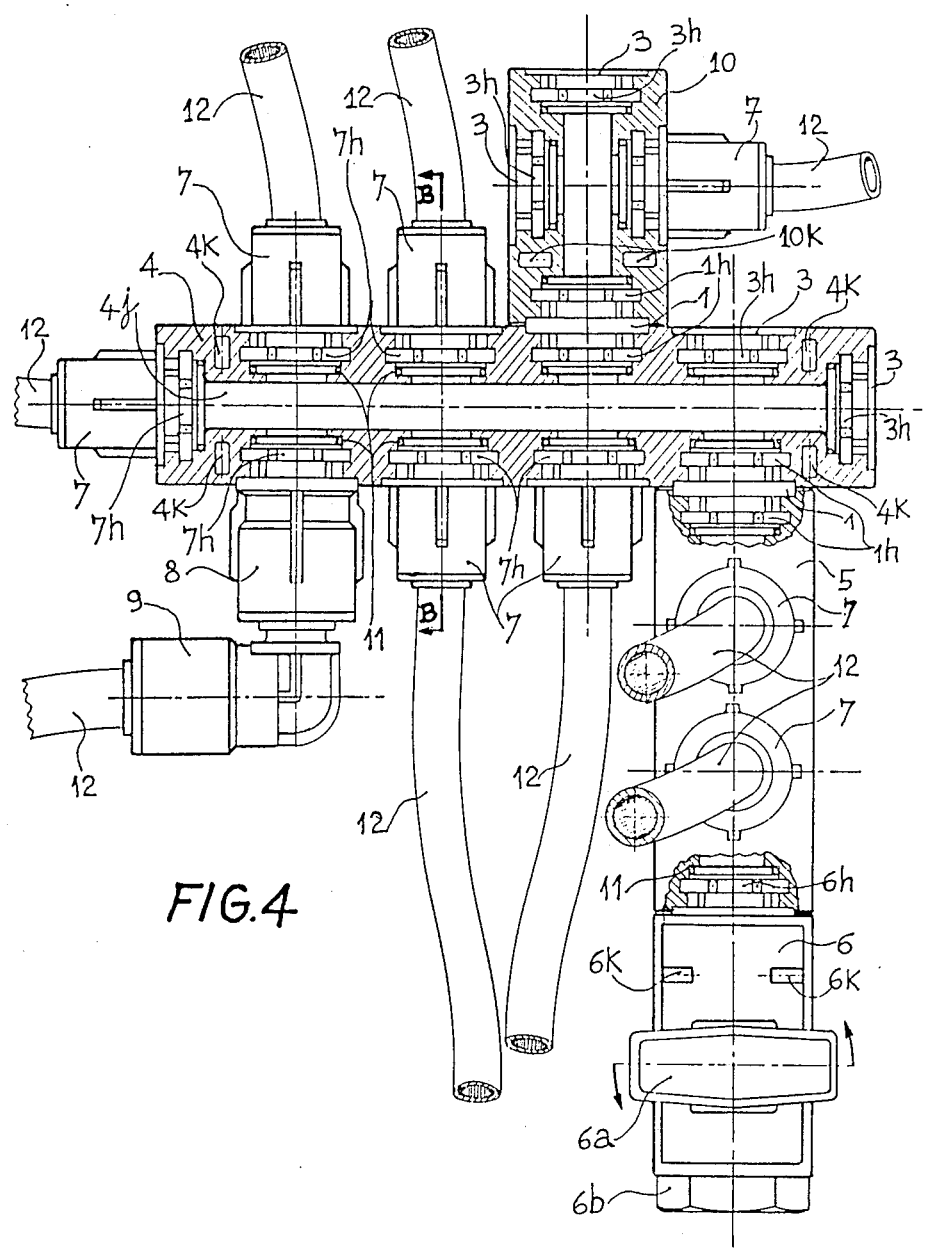
FIG. 4 is a partial section of an assembly of modules with their connections and a tap module in accordance with the invention and tubes going off in several directions.

FIG. 1 is a perspective of a double male bayonet connection 1 in accordance with the invention, acting as a link serving to connect 2 modules together. This double male bayonet connection 1 is also visible in FIGS. 17 and 18, where the details can be seen. One can also see this double male bayonet connection in FIG. 4, where it is linking the two modules together. The body of the connection 1 includes a cylindrical part 1a on which is a smaller cylindrical part of diameter 1b. On this cylindrical part 1b is a cross 1h of which arms 1c are joined together by a square 1f. At the two ends is a small diameter cylindrical part 1d which acts as a carrier for the sealing joint. Running through the connection 1 is the orifice 1e. The cross 1h has a complementary shape to the female bayonet inside the modules. The arms 1c of the male bayonet are placed by rotation behind the lugs 2f of the female bayonet orifices to hold the pieces of the system together.

FIG. 2 is an isometric section of a module 2 in accordance with the invention. The side of the module 2 is bare in this view. The module 2 comprises a body having four adjacent sides 2a, 2b, 2c, 2d which are flat and on which are located the female bayonet orifices 2e, all identical. These female orifices 2e have 4 lugs 2f in relief in a cylindrical boring 2g. The lugs 2f are in relief thanks to openings 2h made behind them in the two opposing sides of the parallelepiped making up the module. One can see on the two latter sides 2i (which have no orifices), openings 2h which emerge in a cut out part of the side 2i. One of the important characteristics of the invention is that all the openings behind the lugs 2f are made by moulding in plastic (or any other material) following only two opposing directions, from the two sides 2i. The fact that these openings are made in only two opposing directions, at the rate of four openings for a female bayonet orifice, enables the modules to be moulded with as many orifices as are needed. Either 1, 2, 3, or X female bayonet orifices are provided on the long sides of the parallelepiped.

There is also an orifice at each end of the parallelepiped. The number of orifices is only limited by the mould production process. All the orifices are joined to a central conduit 2j which passes along the axis of the module. The four adjacent flat sides 2a, 2b, 2c and 2d form a support for other modules 2 which may be linked up to the first module using a double male bayonet connection 1 visible on FIG. 1. As all the orifices are identical on all the modules, whatever their number of orifices, many assembly combinations between modules are possible. Each female bayonet orifice also has two stops 21 which prevent the male bayonet from being fitted in the wrong manner and which also act as guide stops during rotation. Each lug 2f has a half-round notch 2m acting as a locking device at the end of the rotation of the male bayonet. The male bayonets have a corresponding half-round relief which notches and locks by radial deformation of the plastic material, without any axial effort. The stops 2f limit the rotation of the bayonet to 45°. The bayonet is characterized by the ability to mount it in four orthogonal directions, in 90° steps.

This enables output tubes to be fitted in all the required directions. The sides 2i possess a flat edge and also have an area cut out depending on the requirements of the material. It is in this cut out area that the openings 2h emerge, to form the bayonets together with the lugs 2f. In addition, at the bottom of the cut-out parts in the sides 2i, there are the holes 2k. These are two in number for very short modules, and four for long modules. These holes are placed at the ends of the module 2 and run right through it. The fixing screws are placed in these holes 2k. These screws enable the modules to be fixed on their flat sides 2i onto flat supports. FIG. 8 shows a section of the module through the center of the fixing holes 2k.

FIG. 3 shows a male bayonet 3h identical to the bayonet 1h forming part of the double male connection 1 shown in FIG. 1. This double male bayonet is extended at its other end by a closed device or wall 3a, forming a plug. This plug 3 does not exceed the flat surface of the module at all. The plug has a hexagonal nut and a slot enabling it to be fitted and turned to lock it in place. This is visible in FIGS. 10 and 11 which show details of the plug. The plug includes all the basic elements of the double male bayonet connection shown in FIG. 1.

FIG. 4 is a partial section of an assembly of modules in accordance with the invention, and having a number of different orifices. The module 10 is a module with four orifices. The module 5 is a module with six orifices. The module 4 is a module with ten orifices. The modules are connected by double male connections, with male bayonets 1h at each of their ends. Sealing is carried out by toroidal joints 11, placed between the male bayonet 1h and the body of the modules. FIG. 4 also shows the plugs 3 fixed into the modules by their bayonets 3h, and flush with the module.

FIG. 4 also shows male bayonets 7h identical to other male bayonets, of which the other ends form links 7 for tubes 12. There is also a bent connection, made up of a link 8 and a bend 9 with a tube 12 leading away from the assembly. There is also a tap 6 extending a module 5. This tap 6 possesses a male bayonet 6h identical to all male bayonets and a sealing joint 11. The tap 6 possesses a rotating handle 6a, enabling the tap to be opened and closed. It also has a nut 6b in which is a tapping, making possible a standard tube or screw attachment. It should be noted that the direction of the tubes emerging from each of the modules 4, 10 and 5 is different. This is possible thanks to the possibilities offered by the bayonet with four possible positions, enabling each module to be orientated in the direction required by the user.

FIG. 5 is a section as per the axis BB of FIG. 4 in accordance with the invention. FIG. 5 shows 2 bayonet connections 7h extended at their other end by an instantaneous tube connection 12. The detail of the connection can be seen. It is also possible to see the sealing joints or O-ring seals 11 and the central conduit 4j, into which the tube connections 7 emerge.

FIG. 6 is a partial section of two modules 10 and 5. Module 5 is a module with 6 orifices and module 10 is one with four orifices. The 2 modules are separated by a double male bayonet plug connection 13h. So that the user may know that the two bayonets are completely sealed one from the other, the connecting plug is visible by squares of the same form as the modules, 13a. It is also possible to see on FIG. 6 male bayonets extended by connections 7 for tubes 12. These connections are shown in detail in FIG. 14. It is also possible to see a male bayonet 14h (identical to the others) extended by an extension 14 for tubes 12. This extension 14 (different from extension 7) is visible in FIG. 15. One can also see along section line CC, a male bayonet 18h identical to other male bayonets and extended at its other end by a valve tap 18 working in conjunction with another male bayonet 7h with a link 7 for tube 12. This valve tap enables the tube 12, situated along the section line CC, to be opened or closed or to have its throughput regulated. The details of this part 18 and the valve are shown in enlarged form in FIG. 23. FIG. 6 also shows (along section line DD) a bayonet 20h identical to other male bayonets and with an electromagnetic valve gate 20 on its end, working in conjunction with a valve 21 and a connection 7 for a tube 12. This electromagnetic valve can open or close to control the throughput of the tube 12 on the sectin line DD. FIG. 6 also shows a male bayonet 16h identical to other male bayonets and at its other end a threaded connection 16m fitted into a part 16k which can be rotated and directed. This part 16 is shown in enlarged form in FIGS. 20 and 21. FIG. 6 also shows the male bayonet 17h identical to other bayonets and having, at its other ended, a tapped connection 17l in a part 17k which can be rotated and directed. The two parts 16 and 17 enable standard screw connections to be fitted.

FIG. 7 is a partial transverse section of a module as per axis BB of FIG. 4. The illustration shows 2 male bayonets 7h with different sealing joints between the male bayonet and the body 4 of the module. On the right hand side the sealing joint is formed by a toroidal joint 11 with radial tightening, and which gives no axial component. On the left however is a lipped joint 11a, forming the seal between the male bayonet and the module by axial tightening. This joint 11a is built in and carried by the male bayonet 7h, with which it forms a single piece.

Also shown in FIG. 7 is the central conduit 4j which supplies the two male bayonets 7h and the tube connections 7. The same figure also shows the conical valve seatings 71 which are integrated into the male bayonets and the 4 flanges 7i which serve to guide the valves and to let the fluid flow around the valve.

FIG. 8 is a transverse section of the body of module 2 in FIG. 2 through the center of the holes 2k which are used for fixing the module to a flat surface by means of screws. The central conduit 2j is also shown.

FIG. 9 is a partial transverse section of a module 4 as per axis BB with male bayonets 7h of the connections 7 for tube 12. The toroidal sealing joints 11 and the central conduit 4j are also shown.

FIGS. 10 and 11 show the plug 3 including male bayonet 3h and being closed at the bottom 3m. This plug 3 has on its external face a hexagonal nut with an opening 3i, and a slot 3l enabling the plug to be rotated by either of these methods in order to fix it by bayonet. There are also location points 3g which enable the user to be certain that the plug is definitely locked into position.

FIGS. 12 and 13 show a double male plug 13 which forms a sealing plug between two modules. The double male plug 13 must remian visible to the user, which is why it has two squares 13m which remain clearly visible between the modules. If this were not the case the user would not know that the fluids on each side of the barrier were separated from each another. The plug 13 is also visible on FIG. 6.

Figure 14:
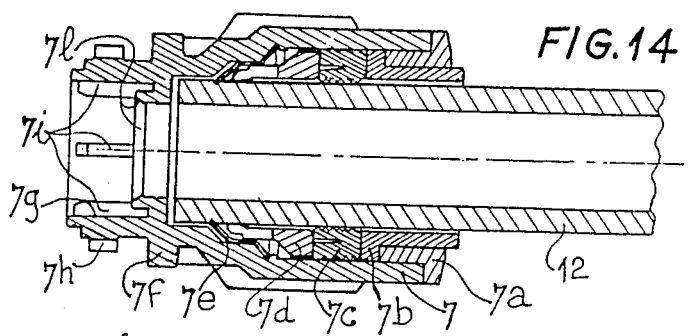
FIG. 14 shows the male bayonet connection and the detail of an instantaneous tube connection, in accordance with the invention.

FIG. 14 is a detail of a male bayonet 7h which is at the other end of an instantaneous connection 7 from that reversing tube 12. It is possible to see the detail of the instantaneous connection made up of a body 7f, a welded stop 7a, a dismantling button 7b, a lipped joint 7c, a counter-button 7d, and a tube-holder 7e.

It is also possible to see the integrated conical valve seating 7l and the four valve guiding flanges 7i in relief in a boring 7g. The connection system is instantaneous for the tube 12 and is patented by the inventor.

Figure 15:
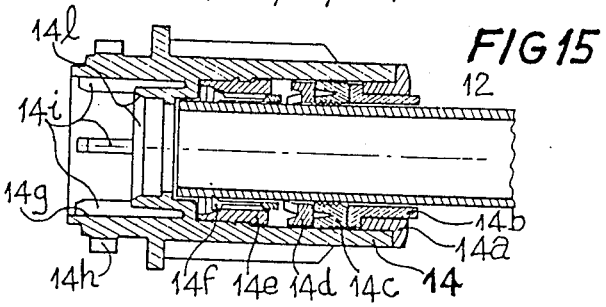
FIG. 15 shows the same thing but with another kind of instantaneous connection in accordance with the invention.

FIG. 15 shows the same details as FIG. 14 but the instantaneous connection system is different. This system is also covered by a patent of the inventor. It comprises a welded stop 14a, a body 14, a lipped joint 14c, a button 14b, a counter-button 14c, a socket 14e, and a tube holding grip 14f.

Figure 16:
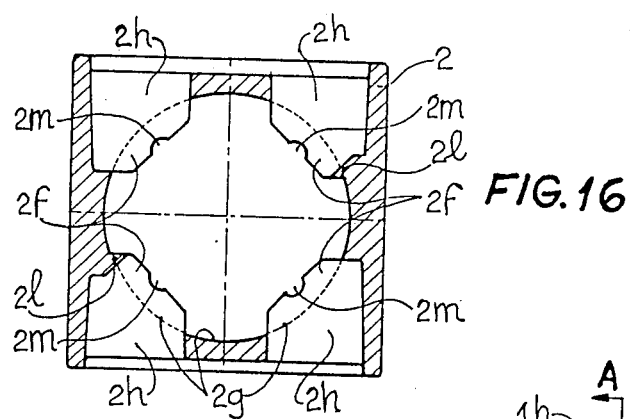
FIG. 16 shows the section of the bare module in FIG. 2 in accordance with the invention, by a transverse view of the 4 openings behind the bayonet lugs of the orifices at the end 2h of the module 2 in FIG. 2.

FIG. 16 shows the bare section of module 2 in accordance with the invention, on a transverse plane through the center of the four openings behind the bayonet lugs 2f of the female orifices at the end of module 2 in FIG. 2. One can see four lugs 2f in which are the half-round locking notches. One can also see four openings 2h and the cylindrical diameter 2g against which the lugs 2f are in relief and with which the lugs 2f form the female bayonet.

Figure 17:
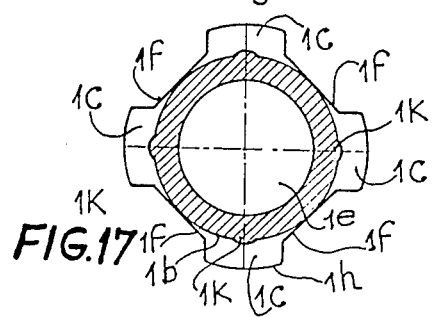
FIGS. 17 and 18 show the details of the male bayonets in accordance with the invention and the half-round flanges 1k used for notching in rotation.
Figure 18:
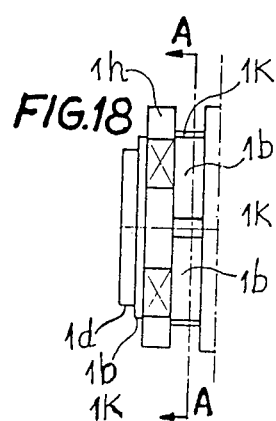

FIGS. 17 and 18 show the details of the male bayonets in accordance with the invention. One can see the male bayonet 1h with its arms 1c linked by the square 1f. It is also possible to see to see in FIG. 17 (which is a section about line AA of FIG. 18) the half-round flanges 1k which are used in conjunction with the notches 2m shown on FIG. 16 to lock the system by rotation. FIG. 18 is an external view of the male bayonet in accordance with the invention. It is possible to see the small diameter portion 1d bearing the toroidal sealing joint, the cylindrical guide 1b and the half-round flanges 1k.

Figure 19:
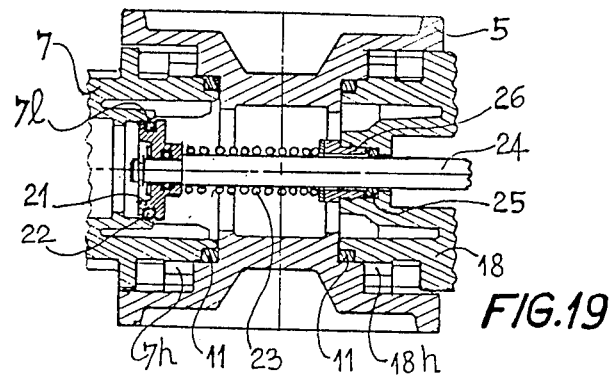
FIG. 19 is a partial section as per CC of module 5 in FIG. 6 in accordance with the invention with a male tap bayonet valve-gate working in conjunction with the valve seating of a male bayonet tube connection.

FIG. 19 is a partial section along line C—C in FIG. 6. It shows a male bayonet identical to other male bayonets 18h on a valve tap 18 with a valve stem 24, a sealing joint 25, a closing spring 23, a valve 21 with a sealing joint 22 providing a seal on a conical seating 71 of a bayonet 7h extended by a connection 7 for a tube 12. The valve is shown in the closed portion on the conical seating 7l.

Figure 20:
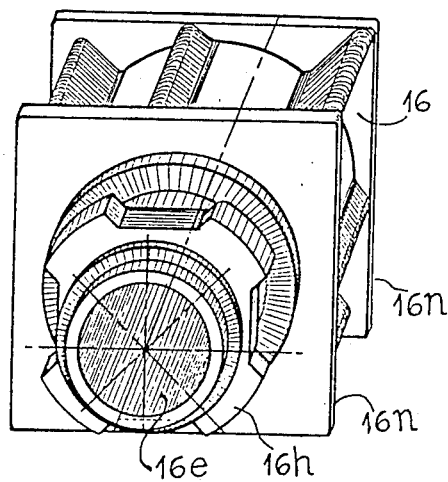
FIGS. 20 and 21 show a male bayonet in accordance with the invention, a tapped turning connection.
Figure 21:
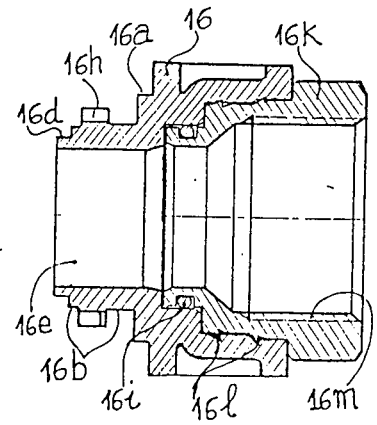

FIGS. 20 and 21 are enlarged details of a male bayonet 16h identical to other male bayonets, extended at its other end by a connection 16k with screw 16m, held in a body 16 by the edges 16l, with a turning joint 16i. This connection 16k can take standard tube connections. FIG. 20 is an isometric projection of this connection seen in section in FIG. 21. This connection 16 is also shown in FIG. 6.

Figure 22:
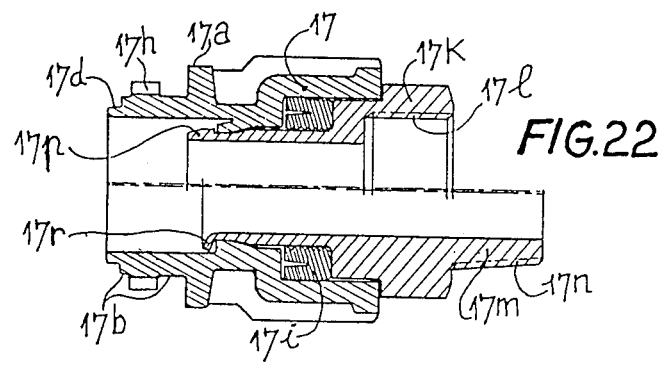
FIG. 22 shows a section of a male bayonet, of the smallest size, turning connection, showing a ½ view of the tapping, and a ½ view of the conical male screw in accordance with the invention.

FIG. 22 is an enlargement of the male bayonet 17h identical to the other male bayonets, extended by a revolving connection 17k and having a lipped joint 17i. This revolving joint 17k is shown in one half view with a tapping 17l and in the other half view with a male end 17m having a conical screw 17n. This connection 17 is shown in FIG. 6.

FIG. 23 shows the section, as per line CC of module 5 in FIG. 6, in accordance with the invention and the enlarged details of the male bayonet 18h extended at its other end by a valve tap 18 with a handle 18a working on a helicoidal notched stem 18b. The spring 23 takes the valve downwards and maintains the handle 18a in contact with the stem 18b. This valve tap enables the adjustment and closure of the seating 7l of the bayonet 7h (with a connection 7 for tube 12).

FIG. 24 is a variation of FIG. 23 showing a valve tap where the upward movement of the stem 24 and the valve 21 are carried out by a screw and nut. The screw 19c enables the valve to be moved up and down and a counter screw 19b enables it to be locked in the required position.

FIG. 25 shows a partial section along section line DD of module 5 of FIG. 6 in accordance with the invention and the male bayonet 20h, identical to other bayonets extended into an electromagnetic unit 20 with a valve 20c servo-assisted by the system 20m, 20l and 24a. The valve 20j of the electromagnet 20b carried by the plunger 20k working on the seating 20l and carrying out the opening and closing of the valve 2*l* on its conical seating 7*l*. The valve is shown wide open. The seating 7*l* is part of the bayonet 7*h* extended at its end by the connection 7 for tube 12.

Figure 26:
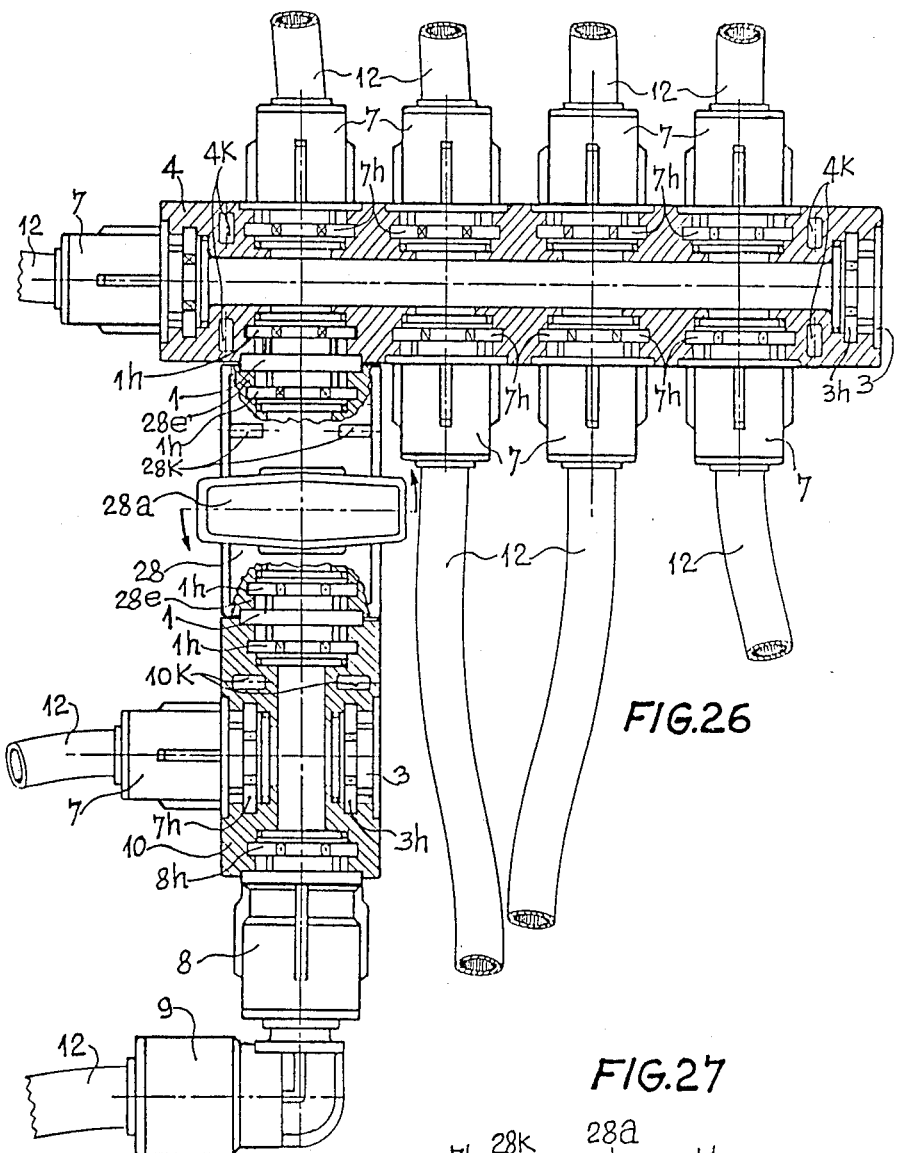
FIG. 26 shows partial sections of 2 modules in accordance with the invention linked together by a plug valve tap 28 with a body in parallelepipedic form, with 2 female bayonet orifices 28e at its ends, in accordance with the invention, the connection between the tap 28 and modules 10 and 4 being made by 2 double male bayonet connections 1.

FIG. 26 shows an assembly of two modules 10 and 4 or a tap 28 of parallelepipedic form in accordance with the invention with two identical female bayonets 28*e* of the same dimensions as on the modules. The tap 28 is used to join the two modules 4 and 10 together and it also enables them to be isolated so as to cut off the fluid supply to a part of the tubes 12. For example it is possible to cut off the water supply to a floor or to a certain number of radiators that one no longer needs to supply.

Figure 27:
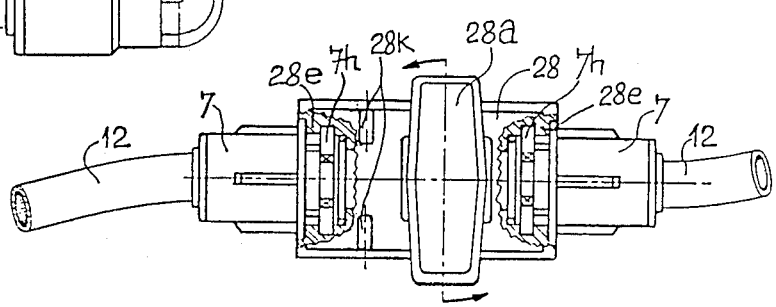
FIG. 27 shows the parallelepipedic shaped tap 28, already shown in FIG. 26, in isolation, having in its two female bayonets, in accordance with the invention, two male bayonets 7h extended from the connections 7 of the tubes 12.

FIG. 27 shows the same tap 28 in partial section used separately with 2 male bayonets 7*h* in its 2 female bayonets 28*e* in accordance with the invention, making connections 7 for tubes 12 at their ends, as well as the ¼ turn handle 28*a*.

These multiple grouped connections for distributing a principal fluid in multiple tubular circuits can be used in numerous industrial applications where fluids have to be redistributed: food industry, canning, beverages, laboratories, aquaculture, marine work, caravans, watering, greenhouses, solar heating, machine tools, compressed air, building and heating. This type of fluid distribution is used for low pressures up to 8 or 10 bars maximum. These uses are the most common and represent approximately 60 or 70% of commercial fluid use. One of the important uses of this multiple fluid distribution system is the sanitary distribution of hot and cold water and of heating water in individual houses or buildings. Naturally the invention is not limitative and those working in this field can apply modifications to the system without going outside the scope of the invention.

I claim:

1. A grouped fluid tube modular connection assembly for distributing a main circuit fluid in multiple tubular circuits, said assembly comprising:
at least one module having a module body with in order, first, second, third and fourth adjacent flat sides, and longitudinally opposite ends, identical orifices within said first and third opposite flat sides of said body, said orifices being defined by a cylindrical boring, radially projecting lugs within said cylindrical boring, openings extending through said module body from opposite second and fourth sides of said module body placing said lugs in relief, said second and forth opposite sides having rectangular recesses cut out, said openings from opposite second and fourth sides of said module body defining, together with said lugs and the cylindrical borings, female bayonet orifices, with four bayonet positions, a central conduit running lengthwise of said modular body, means communicating said female bayonet orifices with said central conduit, said assembly further comprising a plurality of male bayonet elements, said male bayonet elements being in the form of a hollow cylindrical part including a reduced diameter portion with radially projecting arms forming a cross of complimentary shape to the female bayonets internally of said at least one module with the arms of the male bayonet elements being positioned by rotation behind the lugs of the female bayonet orifices, said male bayonet elements being integrated to different function connections, and fixing holes extending completely through the module body within the cut out recesses of said second and said fourth opposite sides for fixing the module body to a support by screws projected through said fixing holes.

2. A grouped fluid tube modular connection assembly in accordance with claim 1 wherein said openings placing of said lugs in relief in said orifices extend solely in two opposing directions within said second second and forth opposite sides of the module body.

3. A grouped fluid tube modular connection assembly in accordance with claim 1 or 2 wherein said openings are four in number for each female bayonet orifice, said at least one module bearing a number of female bayonet orifices on each of said first and third opposite flat sides, extending over the length of the module body and said orifices being all linked by said central conduit which intersects said orifices.

4. A grouped fluid tube modular connection assembly in accordance with claim 1 wherein said at least one module comprises at least two end to end abutting modules, forming bearing surfaces, and a double male bayonet element having an axial bore and forming a communicating link between said modules and having male bayonet cross arms at opposite ends is coupled at opposite ends with respective aligned female bayonet orifices of said first and second modules.

5. A grouped fluid tube modular connection assembly in accordance with claim 1 wherein said at least one module is parallelepipedic having on four flat adjacent sides solely said female bayonet orifices.

6. A grouped fluid tube modular connection assembly in accordance with claim 1 wherein each female bayonet orifice lug has a half-round notch which acts to lock a male bayonet element cross arm into position at the end of the male bayonet element rotating movement, and said male bayonet elements have a complementary half-round relief such that locking occurs without any axial effort.

7. A grouped fluid tube modular connection assembly in accordance with claim 1 wherein each female bayonet orifice has two angular reliefs in said cylindrical boring which act as rotation stops to a male bayonet element cross arm, in both directions preventing an incorrect rotation direction during assembly, said two angular reliefs constituting fixed stops acting after a 45° turn in one direction, and dismantling stops acting after a 45° turn in the opposite direction.

8. A grouped fluid tube modular connection assembly in accordance with claim 1, wherein said first and third sides of the module body bearing said orifices forming said female bayonet together with said lugs are cut out and a peripheral strip is provided on an edge of the body making a flat surface enabling said at least one module to be placed against a flat support, and wherein said openings extending through said module body from said second side to said fourth side of the module body constituting multiple transverse holes at opposite ends thereof enabling the module body to be fixed to a support by screws projecting through such holes.

9. A grouped fluid tube modular connection assembly in accordance with claim 1 wherein said male bayonet element is extended at one end by a closure closing off the hollow cylinder and forming a plug, said plug being flush with the flat side of said at least one module receiving said male bayonet element and said plug also having a hexagonal nut and a slot facilitating assembly and disassembly of said plug to said module body.

10. A grouped fluid tube modular connection assembly in accordance with claim 1 wherein the male bayonet is extended at one end by a connection for instantaneously holding and sealing of a tube.

11. A grouped fluid tube modular connection assembly in accordance with claim 1 wherein a first male bayonet element mounted within a female bayonet orifice of said module body has a conical valve seating, a second male bayonet element on the opposite side of said module body has a shiftable valve member for movement into valve closing contact with said conical valve seating and wherein said first male bayonet element also includes flanges to guide the valve member placed in the cylindrical boring of said module body, and said valve seating enabling a closing and regulation of the fluid output through the valve of said second valve element.

12. A grouped fluid tube modular connection assembly in accordance with claim 1 wherein the male bayonet element forms a portion of a rectangular part of equal section to said at least one module body of sufficient thickness to be clearly visible and said rectangular part itself is extended by an identical male bayonet element, thereby forming a visible unpierced linking plug for linking two modules and receiving different fluids.

13. A grouped fluid tube modular connection assembly in accordance with claim 1 wherein the male bayonet element is extended at one end by a square part equal in section to the module body and includes a tap connection for use with a standard screw connection for fluid tubes and being moveable in relation to the square part.

14. A grouped fluid tube modular connection in accordance with claim 1 wherein the male bayonet element is extended by a part having a threaded connection, a spring catch assembled with said male bayonet element and an annular joint forming a seal whereby said part enables a standard connection to be used by being rotated by a spanner without risking damage to the male bayonet element by extra effort.

15. A grouped fluid tube modular connection assembly in accordance with claim 1 wherein the male bayonet element is extended at one end by a valve tap head, a valve borne by said valve tap head, said valve working as a tap and closing on a conical seating of a male bayonet element placed coaxially within the female bayonet orifice to the opposite side of said at least one module from said side bearing said valve tap head, said valve tap having an operating button, and a helicoidal stem for adjustable closure, and said tap including sealing joints.

16. A grouped fluid tube modular connection assembly in accordance with claim 1 wherein the male bayonet element is extended at one end by a servo-assisted electromagnetic valve, and said electromagnetic valve has a valve member which opens and closes on a conical seating of a male bayonet element coaxially within the opposite female bayonet orifice on the opposite side of said module.

17. A grouped fluid tube modular connection assembly in accordance with claim 1 further comprising a seal between a male bayonet element and the module body comprising a toroidal annular joint having only radial tightening.

18. A grouped fluid tube modular connection assembly in accordance with claim 1 further comprising a seal between the male bayonet element and said at least one module body comprising a lip joint embedded and carried by the male bayonet element.

19. A grouped fluid tube modular connection assembly as claimed in claim 1 further comprising a parallelepipedic headed body of the same cross section as said at least one module, said parallelepipedic headed body carrying a plug tap, having at one end a male bayonet element and at the other end a tapped hole for making standard connections and said plug tap being placed in the same way as the male bayonet element having opposed flat sides and fixing holes passing through said body between opposite flat sides for receiving screws.

20. A grouped fluid tube modular connection assembly as claimed in claim 1 wherein said at least one module comprises two modules and said assembly further comprises a parallelepipedic body of the same cross section as the modules including a plug tap and, at each end of the parallelepipedic body, a female bayonet orifice, said plug tap being placed between said two modules, said plug tap having a flat fixing side and said parallelepipedic body having holes passing therethrough for screw fixing, and having openings forming two female bayonets in two opposing directions and said female bayonet orifices of said parallelepipedic body being identical to those of said modules.

* * * * *